United States Patent
Brand et al.

(10) Patent No.: US 8,111,141 B1
(45) Date of Patent: Feb. 7, 2012

(54) RECEIVED SIGNAL STRENGTH DISTANCE DETERMINATION OF LOW FREQUENCY TAGS

(75) Inventors: Timothy K. Brand, Cupertino, CA (US); Stephen Earl Hilliker, San Jose, CA (US); Joseph Siufai Chan, Los Gatos, CA (US); Albert Nardelli, Mountain View, CA (US); Nikola Cargonja, San Carlos, CA (US); Bruno Skracic, San Jose, CA (US); Don Ahn, Sunnyvale, CA (US)

(73) Assignee: Savi Technology, Inc., Mountain View, CA (US)

( * ) Notice: Subject to any disclaimer, the term of this patent is extended or adjusted under 35 U.S.C. 154(b) by 1114 days.

(21) Appl. No.: 11/694,905

(22) Filed: Mar. 30, 2007

(51) Int. Cl.
*H04Q 5/22* (2006.01)
(52) U.S. Cl. .................. 340/10.5; 340/539.13
(58) Field of Classification Search ............... 340/10.5, 340/539.13, 992, 10.3; 342/47
See application file for complete search history.

(56) References Cited

U.S. PATENT DOCUMENTS

| | | | | |
|---|---|---|---|---|
| 5,170,172 | A | * | 12/1992 | Weinstein ................. 342/458 |
| 5,631,642 | A | | 5/1997 | Brockelsby et al. |
| 5,977,913 | A | * | 11/1999 | Christ ..................... 342/465 |
| 6,542,114 | B1 | | 4/2003 | Eagleson et al. |
| 6,720,888 | B2 | | 4/2004 | Eagleson et al. |
| 6,765,484 | B2 | | 7/2004 | Eagleson et al. |
| 6,940,392 | B2 | | 9/2005 | Chan et al. |
| 7,248,883 | B2 | * | 7/2007 | Cuffaro ................ 455/456.1 |
| 7,751,957 | B2 | * | 7/2010 | Nagaoka et al. ............ 701/36 |
| 2007/0273481 | A1 | * | 11/2007 | Soleimani ................ 340/10.1 |

* cited by examiner

*Primary Examiner* — Vernal Brown
(74) *Attorney, Agent, or Firm* — Fenwick & West LLP

(57) ABSTRACT

Systems and methods provide for determining a distance between a signpost and a tag and for locating a tag using multiple signposts. The system uses a signal received at a tag from a signpost, and from them measures the signal strength of the signal with respect to one or more antennas on the tag. The system calculates an RSSI using the measured signal strength, from which a distance can be determined between the signpost and the tag. The system also uses signals received from multiple signposts, to measure multiple signal strengths, resulting in multiple distance determinations corresponding to the various signposts, thereby establishing a location for the tag.

37 Claims, 9 Drawing Sheets

FIG. 9

| Preamble 905 | Signpost Code 910 | Tag Command 915 | Control Command 920 | Parameter 925 | Flag 930 | Error Control 935 | Packet End 940 |

| Preamble 1005 | 1 1010 | Tag Type 1015 | Asset Type 1020 | Beacon Code 1025 | Signpost Code 1030 | Last Command 1035 | RSSI Value (x) 1040a | RSSI Value (y) 1040b | RSSI Value (z) 1040c | Error Control 1050 | Packet End 1055 |

RSSI Value (Tot) 1045 → {1040a, 1040b, 1040c}

1000b

| Preamble 1005 | 0 1010 | Tag Type 1015 | Asset Type 1020 | Beacon Code 1025 | Error Control 1050 | Packet End 1055 |

RECEIVED SIGNAL STRENGTH DISTANCE DETERMINATION OF LOW FREQUENCY TAGS

RELATED APPLICATIONS

This application is related to patent application Ser. No. 09/841,780 entitled "Method and Apparatus for Tracking Items Using Dual Frequency Tags," now U.S. Pat. No. 6,542,114, and is related to patent application Ser. No. 11/694,908 entitled "Received Signal Strength Location Determination of Low Frequency Tags," filed Mar. 30, 2007; each of which are incorporated herein in their entirety by reference.

BACKGROUND

The present invention relates generally to tracking items using radio frequency identification tags and, more particularly, to determination of distances between tags and signposts, and of the location of the signposts.

According to known techniques for tracking items, a device known as a radio frequency identification tag is mounted on each item, and radio frequency signals are used to communicate information between the tag and a receiver, which is referred to as a reader. Existing tags provide limited accuracy with respect to determining distances between tags and signposts, and in determining the specific location of the tag. For example, existing systems may determine the distance to between the tag and reader based on the magnitude of the signal emitted by the tag, as received at the reader. However, similar existing tags may transmit signals with slightly different magnitudes, and environmental factors may affect the magnitude of the signals transmitted by these tags. As a result, there is a large margin of error in the ability of the reader to accurately determine the distance to a tag based on the magnitude of the received signal.

Similarly, existing systems provide for crude measurements of distance based on the range of the signpost used in conjunction with the tag. However, these provide at best a rough estimate of the location of a tag to within the range of the signpost. Further, it may be even more difficult to determine the direction the tag is traveling using these known methods.

SUMMARY

In various embodiments, the present invention provides methods and systems for determining a distance between a signpost and a tag and for locating a tag using multiple signposts. Using a signal received at a tag from a signpost, the signal strength of the signal is measured with respect to one or more antennas on the tag. A received signal strength indication (RSSI) can be calculated using the measured signal strength, from which a distance can be determined between the signpost and the tag. Using signals received from multiple signposts, multiple signal strengths can be measured, resulting in multiple distance determinations corresponding to the various signposts, thereby establishing a location for the tag.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 9 is a diagrammatic view of a digital word corresponding to a signpost signal having several different fields of information according to one embodiment of the present invention.

FIG. 10 is a diagrammatic view of a digital word corresponding to a tag signal having several different fields of information according to one embodiment of the present invention.

One skilled in the art will readily recognize from the following discussion that alternative embodiments of the structures and methods illustrated herein may be employed without departing from the principles of the present invention.

DETAILED DESCRIPTION OF THE EMBODIMENTS

Figure 1:
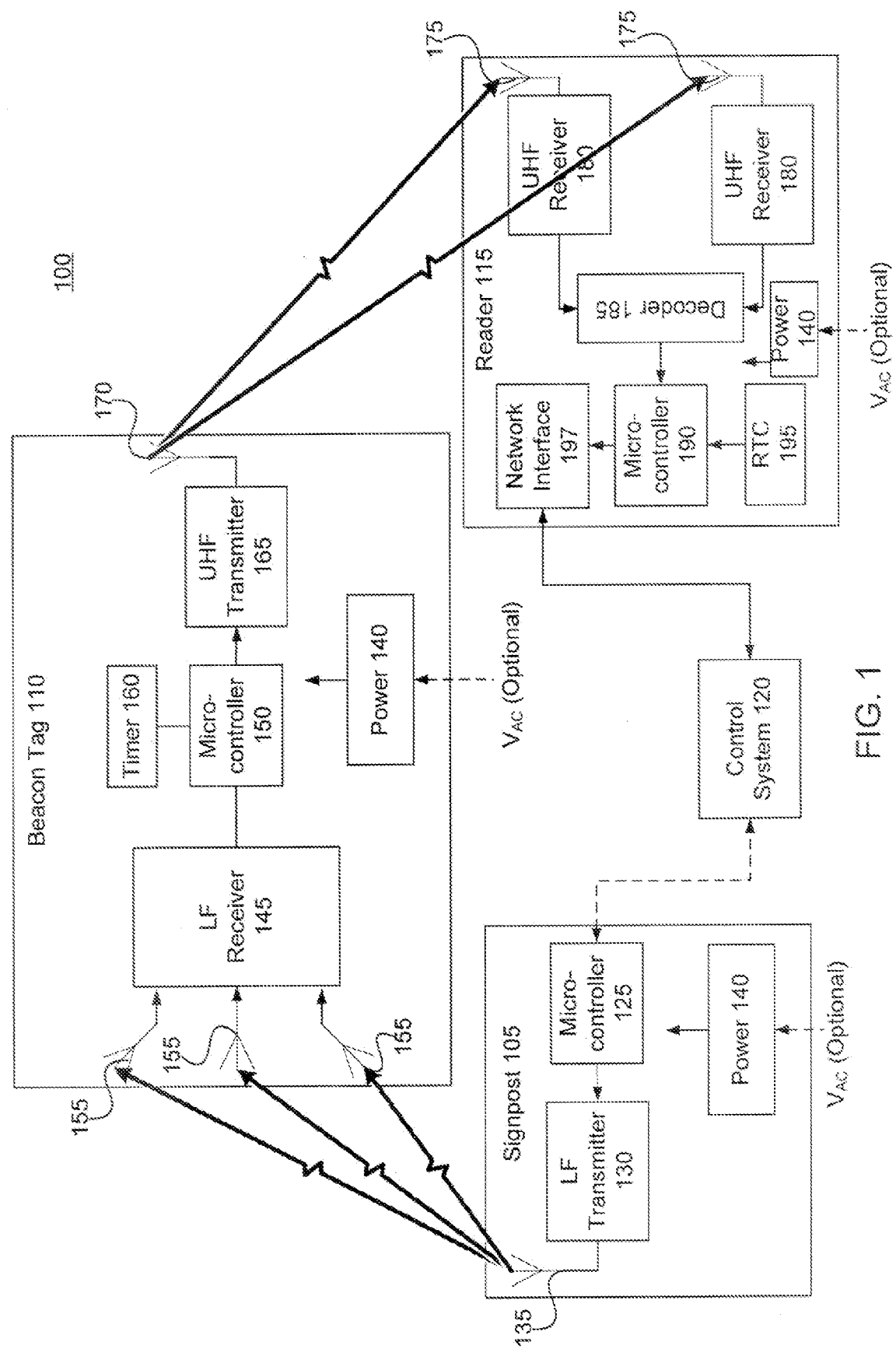
FIG. 1 is a block diagram illustrating the architecture of one embodiment of a system for determining a distance between a signpost and a tag and/or locating the tag using multiple signposts.

FIG. 1 is a block diagram illustrating the architecture of one embodiment of a system 100 useful for determining a distance between a signpost and a tag and/or locating the tag using multiple signposts.

The system 100 includes a signpost 105, a tag 110, a reader 115, and a control system 120. The system 100 may include many signposts of the type shown at 105, many tags of the type shown at 110, and several readers of the type shown at 115. However, for clarity in explaining certain fundamental aspects of the present invention, FIG. 1 shows only one signpost 105, one tag 110, and one reader 115.

Focusing first on the signpost 105, it includes a microcontroller 125. Persons skilled in the art are familiar with the fact that a microcontroller is an integrated circuit which includes a microprocessor, a read only memory (ROM) containing a computer program and static data for the microprocessor, and a random access memory (RAM) in which the microprocessor can store dynamic data during system operation. The signpost 105 also includes a low frequency transmitter 130 that is controlled by the microcontroller 125, which transmits a low frequency signpost signal through an antenna 135. The transmitter 130 is of a type known to those skilled in the art, and is therefore not described here in greater detail. The antenna 135 of the signpost 105 can be a ferrite core, and/or planar coil, or other antenna type. The antenna 135 is configured to transmit an omni-directional signal, but it will be recognized that the antenna could alternatively be configured so as to transmit a signal which is to some extent directional.

In the embodiment of FIG. 1, the transmitter 130 generates a signpost signal by effecting amplitude modulation of a carrier signal, which can have a frequency within a range of approximately 30 KHz to 30 MHZ. In the embodiment of FIG. 1, and with due regard to compliance with governmental regulations of various countries regarding electromagnetic emissions, the carrier frequency is selected to be 123 KHz, but could alternatively be some other frequency, such as 125 KHz or 13.56 MHz. A further consideration in the selection of the indicated frequency range is that the signpost signals will exhibit near field characteristics. The localized nature of signals in this frequency range helps to facilitate compliance with governmental regulations in the specific context of the present invention, and also helps to minimize reception of these signals by other tags of the type shown at 110, which are in the general vicinity of the signpost 105 but are beyond an intended transmission range of the signpost signals. As known by persons skilled in the art, a signal with near field characteristics has a roll-off which is roughly three times higher (db/Octave) than the roll-off for a signal with far field characteristics. Consequently, the signpost signals intentionally have a relatively short transmission range, which in the disclosed embodiment is adjustable but is typically about ten to fifty feet. Due to the fact that the signpost signals exhibit near field characteristics, the transmission and reception of the signpost signals may be viewed as more of a magnetic coupling between two antennas, rather than propagating radio frequency energy.

The signpost 105 also includes a power source 140, which would typically be a fixed or mobile DC source or a DC converter coupled to an AC source. However, in situations where the signpost 105 is mobile, it is alternatively possible to power the signpost 105 using a battery.

As shown diagrammatically by a broken line in FIG. 1, the microcontroller 125 of the signpost 105 can optionally be coupled to the control system 120 by a standard RS-232 serial interface. The RS-232 interface would typically be present only where the signpost 105 is fixedly mounted in a stationary location, as opposed to a situation where the signpost 105 is mounted on some form of mobile device. Alternatively, the RS-232 interface could couple the signpost 105 to the reader 115, because the reader 115 would typically be closer to the signpost 105 than the control system 120. In that case, when the control system 120 wished to communicate with the signpost 105, it would do so through the reader 115. Although the interface in FIG. 1 is an RS-232 interface, it will be recognized that it could alternatively be some other suitable interface, such as an Ethernet interface, an RS-485 interface, USB interface, or a wireless interface.

The signpost 105 normally transmits the signpost signal at periodic or event triggered intervals. The time interval between successive transmissions may be configured to be relatively small, such as 100 msec, or relative large, such as 24 hours, depending on the particular circumstances of a given signpost 105 relative to the rest of the system. Each signpost signal transmitted by the signpost 105 includes several different elements of information, which will be discussed in greater detail in conjunction with FIG. 9. Optionally, signpost signals can be event driven.

Turning to the tag 110, the tag 110 includes a low frequency receiver 145, which is designed to receive the signpost signals, extract information from them, and supply this information to a microcontroller 150 of the tag 110. The signpost signals are received at one or more receiving antennas 155 on the low frequency receiver 145. In some embodiments, there are two antennas 155, and in some embodiments there are three antennas 155. In one embodiment, the antennas 155 each are orthogonal to the other antennas 155. The microcontroller 150 may include a 12-bit analog to digital converter according to one embodiment, e.g., MSP430F148 made by Texas Instruments of Dallas, Tex. Alternatively, a 16-bit analog to digital converter may be used.

In one embodiment, a low frequency receiver 145 is an ultra low power, three channel low frequency amplitude shift keying (ASK) receiver that incorporates an intelligent pattern detection algorithm that provides reliable operation in the presence of strong interference. In this example, a received signal strength indication (RSSI) signal can be generated for each receiving channel on the low frequency receiver 145. The low frequency receiver 145 can be, e.g., 3D Low Power Wakeup Receiver AS3931, manufactured by Austria Microsystems AG, of Schloss Premstätten, Austria.

The tag 110 also includes a timer 160 that can be used by the microcontroller 150 to measure time intervals. The tag 110 further includes a power source 140, which is typically a battery. However, in a situation where the tag 110 is stationarily mounted, the power source 140 could alternatively be an AC/DC adapter which is powered by an external source of 120 $V_{AC}$ power, as indicated diagrammatically by a broken line in FIG. 1.

The microcontroller 150 controls an ultra high frequency (UHF) transmitter 165 of a known type, which in turn is coupled to a transmitting antenna 170 of a known type. In the disclosed embodiment, the antenna 170 is omni-directional, but it will be recognized that the antenna 170 could alternatively be configured to be directional. Using the transmitter 165 and the antenna 170, the microcontroller 150 of the tag 110 can transmit tag signals to the reader 115. In the embodiment of FIG. 1, the tag signals are generated by frequency shift keying (FSK) modulation of certain tag information onto a carrier signal, for example, having a frequency of 433.92 MHz. A suitable alternative frequency is 915 MHz, but the frequency of 433.92 MHz is used in the disclosed embodiment because it is available for use in a wider number of countries than 915 MHz under prevailing governmental regulations for transmission of electromagnetic signals. The transmission range for the tag signals is substantially longer than that for the signpost signals, and in the disclosed embodiment can be up to about 1000 feet. The tag signals are transmitted using a technique known in the art as a slotted aloha protocol according to one embodiment, to reduce interference between tag signals transmitted by different tags 110. The tag signals are discussed further in conjunction with FIG. 10.

Referring again to FIG. 1, the reader 115 will now be described in greater detail. The basic function of the reader 115 is to receive tag signals from various tags (such as the tag 110), verify that each received tag signal is valid, perform error detection and correction where needed, extract information from the tag signals, and then pass this extracted information on to the control system 120. The reader 115 includes two antennas 175, which are each suitable for receiving UHF wireless signals. The reader 115 also includes two UHF receivers 180, which each have an input coupled to a respective one of the antennas 175. The two UHF antennas are 175 arranged to extend perpendicular to each other. The reader 115 is capable of determining which of the two antennas 175 is producing the strongest output in response to a given tag signal. The reader 115 then selects the stronger output for use as the received version of that particular tag signal.

The reader 115 also includes a decoder 185, which has two inputs that are each coupled to an output of a respective one of the receivers 180. The decoder 185 processes the signals received by each of the receivers 180, in order to extract usable information therefrom, which can then be passed to a microcontroller 190 of the reader 115. A real time clock (RTC) circuit 195 is coupled to the microcontroller 190. Further, the reader 115 includes a network interface 197. A network 197 may be of a type known in the industry as an Ethernet network, and couples the network interface 197 of the reader 115 to the control system 120, in order to facilitate communication between the reader 115 and the control system 120.

The reader 115 further includes a power source 140, which is typically a battery. However, in a situation where the reader 115 is stationarily mounted, the power source 140 could alternatively be an AC/DC adapter which is powered by an external source of 120 $V_{AC}$ power, as indicated diagrammatically by a broken line in FIG. 1.

The control system 120, or site server, can be a local portion of a centralized system for security, tracking, and the like. The control system 120 receives the signals from the reader 115, and maintains information in an electronic form about the items associated with each tag. Some processing may take place at the control system 120, as discussed further in conjunction with FIGS. 3 and 11. In addition, the control system 120 may be responsible for synchronizing signpost signals for signposts with overlapping ranges. The control system 120 has full ability to coordinate the signposts, for example alternating the signals of two overlapping signposts using odd and even numbered seconds respectively.

Figure 2:
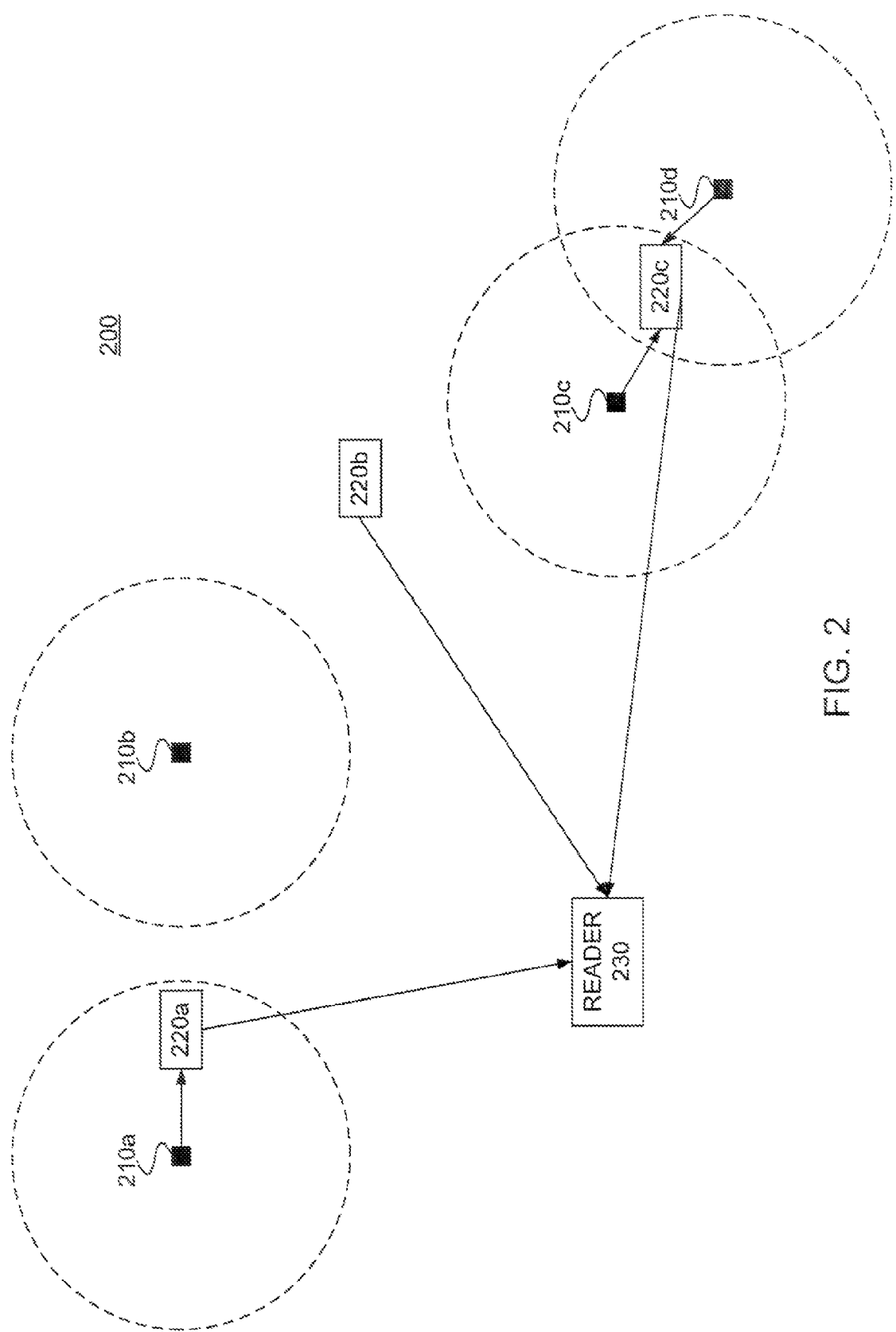
FIG. 2 is a diagrammatic top view of a system which represents a practical application of a system of the type shown in FIG. 1 according to one embodiment of the present invention.

FIG. 2 is a diagrammatic top view of a system 200 which represents one practical application of a system 100 of the type shown in FIG. 1. The system 200 of FIG. 2 includes a plurality of signposts 210, four of which are shown in FIG. 2. Each of the signposts 210 is similar to the signpost 105 of FIG. 1, except that they each use a respective unique signpost code, as will be described further in conjunction with FIG. 9.

The signposts 210 are each stationarily mounted in the embodiment shown in FIG. 2, for example on the ceiling of a warehouse or other industrial facility. However, the stationary and mobile characteristics of the signposts 210 and tags 220 can be reversed. The signposts 210 may be arranged in a regular array, but only four are shown in FIG. 2 for clarity. The broken line circle which extends around each signpost in FIG. 2 is a diagrammatic representation of the effective outer limit of the transmission range of the signpost signals emitted by that signpost 200. As discussed above, each signpost 200 has a limited transmission range of only about 50 feet or less. In some cases, the spacing between the signposts 210 of the system 200 has been intentionally selected so that no two signposts 210 have overlapping transmission ranges, such as signposts 210a and 210b. In other cases, the spacing between the signposts 210 of the system 200 has been intentionally selected so that the signposts 210 do have overlapping transmission ranges, such as signposts 210c and 210d. Although many more signposts 210 may be used in a system 200 than are shown in FIG. 2, the signposts 210 shown are sufficient for purposes of explaining certain principles of the present invention.

Three tags 220 are also depicted in FIG. 2. The tags 220 are each effectively the same to the tag shown at 110 in FIG. 1, but are given a separate reference numeral here for clarity. For purposes of the following explanation, it is assumed that the tags 220 are each mounted on a different mobile device, such as a container, a pallet, a forklift, a trailer which can support a container, a tractor which can pull a trailer, or some other type of mobile device.

A reader 230 is stationarily mounted within the array of signposts 210, for example on the same ceiling that supports the signposts. The reader 230 is the same as the reader shown at 115 in FIG. 1, but is given a separate reference numeral here for clarity. The system 200 may include a number of other equivalent readers at spaced locations, but only one reader 230 is illustrated in FIG. 2 in order to facilitate a clear explanation of certain features of the invention.

Focusing first on the tag 220a, it will be noted from FIG. 2 that this tag 220 is currently within the transmission range of the signpost 210a. Consequently, the tag 220a will be receiving signpost signals from the signpost 210a, and may be transmitting tag signals to the reader 230, e.g., if in beacon mode. The tag signals will include the tag code unique to the tag 220a, as further described in conjunction with FIG. 4, well as the signpost code unique to the signpost 210a, as further described in conjunction with FIG. 9. Consequently, since this signpost code and this tag code are received in combination with each other in the tag signal, the control system 120 associated with the reader 230 can determine that the tag 220a is presently within the transmission range of the signpost 210a. This in turn means that the mobile device which carries the tag 220a is currently very close to the signpost 210a. Since the control system 120 knows the physical location of the signpost 210a, the system 120 can make a relatively accurate determination of the current location of the mobile device which carries the tag 220a, localized to the transmission range of the signpost 210a. In particular, the system 120 can determine the current location of the tag 220a and its associated mobile device to an accuracy of about 50 feet, which is the radius of the transmission range of the signpost 210a. It will be recognized that this capability is due in part to the fact that the signpost signals have a relatively local transmission range, whereas the tag signals have a transmission range which is about 20 times farther than the transmission range of the signpost signals. In some embodiments, the range of the signpost is programmable, e.g., dependent upon the signal strength qualification level set and/or the power setting for the signpost.

Focusing next on the tag 220b, it will be noted from FIG. 2 that this tag 220 is currently not within the transmission range of any signpost 210. Consequently, the tag 220b will not be receiving signpost signals, and thus will be transmitting tag signals to the reader 230 without any signpost signals. By analyzing the strength of the tag signal 220b, as received at the reader 230, the control system 120 associated with the reader 230 could make a very rough estimate of the distance between the tag 220b and reader 230. However, it would be difficult for the control system 120 to accurately determine which direction the tag signal came from.

Therefore, the tag 220b is temporarily situated where the system 200 cannot determine its location as accurately as if it were currently within the transmission range of any of the signposts 210. Nevertheless, the system 200 may still have a relatively accurate idea of the current location of the tag 220b, by tracking it over time. For example, the system 200 may know that the tag 220b reached its current location by moving through the transmission range of signpost 210a and then through the transmission range of signpost 210b, and the system 200 may thus predict the approximate location of the tag 220b. Therefore, even though tag 220b is not currently within the transmission range of any signpost 210, the system 200 still has a better idea of the current location of the tag 220b than would be the case if there were no signposts 210 at all. A further consideration in this regard is that, within a warehouse or other industrial facility, there are often defined paths that mobile devices tend to follow through the facility. Accordingly, the system may be well aware that there is a defined path which extends successively past signpost 210a, signpost 210b, etc. This will provide the system 200 with an even better ability to accurately estimate the current location of tag 220b, even when it is not currently within the transmission range of any of the signposts 210.

Focusing finally on the tag 220c, it will be noted from FIG. 2 that this tag 220 is currently within the transmission range of signposts 210c and 210d. Consequently, the tag 220c will be receiving signpost signals from both signposts 210c, 210d, and will be transmitting a plurality of tag signals to the reader 230. The tag signals will include the tag code unique to the tag 220c, as further described in conjunction with FIG. 4, well as the signpost codes unique to the signposts 210c, 210d, respectively, as further described in conjunction with FIG. 9. Consequently, since the signpost codes and this tag code are received in combination with each other in the tag signal, the control system 120 associated with the reader 230 can determine that the tag 220c is presently within the transmission range of both signposts 210c, 210d. This in turn means that the mobile device which carries the tag 220c is currently very close to both signposts 210c, 210d. Since the control system 120 knows the physical location of the signposts 210c, 210d, the system can make a relatively accurate determination of the current location of the mobile device which carries the tag 220c, localized to the overlapping transmission ranges of the signposts 210c, 210d. In particular, the system can determine the current location of the tag 220c and its associated mobile device to an accuracy of the area where the ranges overlap, as discussed further herein. It will be recognized that this capability is due in part to the fact that the signpost signals have a relatively local transmission range, whereas the tag signals have a transmission range which is about 20 times farther than the transmission range of the signpost signals.

It is also possible for two or more tags to be simultaneously within the transmission range of a single signpost (not shown), such that all of those tags are simultaneously receiving the same signpost signal emitted by that signpost. In this scenario, the reader 230 would receive a separate tag signal from each of the tags 220, and each of these tag signals includes the unique tag code of the corresponding tag, in combination with the signpost code of the signpost 210. Thus, the control system 120 associated with reader 230 can distinguish the tags 220 from each other, due to their unique tag codes, and can also determine that all of these tags are currently at locations within the transmission range of the same signpost 210.

Figure 3A:
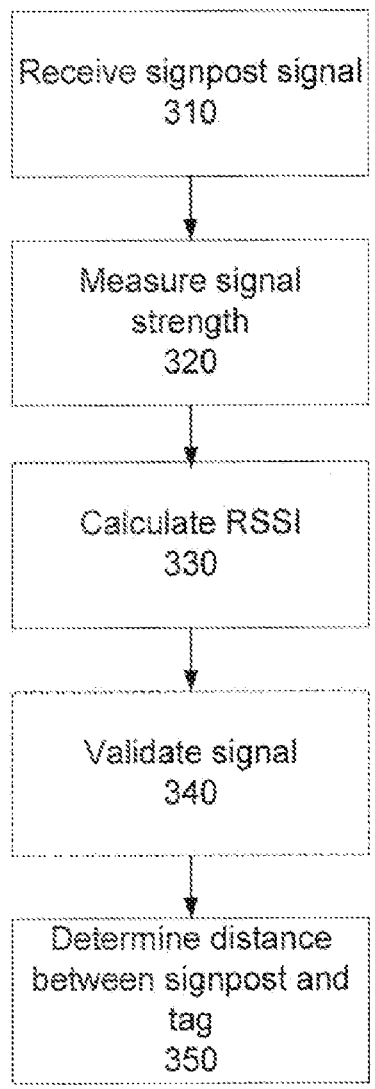
FIG. 3A is a flowchart depicting a method of determining a distance between a signpost and a tag according to one embodiment of the present invention.

FIG. 3A is a flowchart depicting a method of determining a distance between a signpost and a tag according to one embodiment of the present invention. The method pertains to a single signpost in conjunction with a single tag.

The method begins with receiving 310 a signpost signal at a tag from a signpost. The signpost signals are near-field signals of primarily magnetic character. In conjunction with the signpost signals, a signpost code representing a unique identification code for the signpost may be received. In addition, data indicating signal strength qualification level may be provided by the signpost signals, e.g., to be used to validate 340 received signals. The signpost signals are described in greater detail in conjunction with FIG. 9.

Next, a signal strength for the received signal is measured 320 at the tag with respect to one or more antennas on the tag. In one embodiment, the tag includes only one antenna. In another embodiment, the tag includes two antennas oriented orthogonal to each other. In yet another embodiment in the tag includes three antennas each oriented orthogonal to each other. In these embodiments, a signal strength is measured 320 at each of the antennas. The signal strength measurements may take place at the RSSI pin for the receiving channel on a low frequency receiver on the tag, e.g., at receiver 145 shown in FIG. 1. In some cases the signal strength may be measured 320 at more than one point in time, to determine the distance between the signpost and tag over time.

Then, for each of the one or more antennas, a received signal strength indication (RSSI) is calculated 330 using the measured signal strength of the signal received from the signpost. If the signal is received 310 at more than one antenna, then the received signal strength value is calculated 330 for each of the antennas. In addition, or alternatively, an overall RSSI may be calculated using the signal information for a plurality of antennas. If the signal strength is measured 320 at more than one point in time, then the received signal strength value is calculated 330 for each time period.

Assuming that the dipole moment of the signpost is known, the received signal strength can be used to approximate the distance between the signpost and the tag using this information. Because the signal strength is measured 320 at each antenna, an RSSI is calculated 330 for each antenna, and/or an overall RSSI using all antennas. The overall RSSI calculation is described further below in conjunction with step 350.

Figure 4:
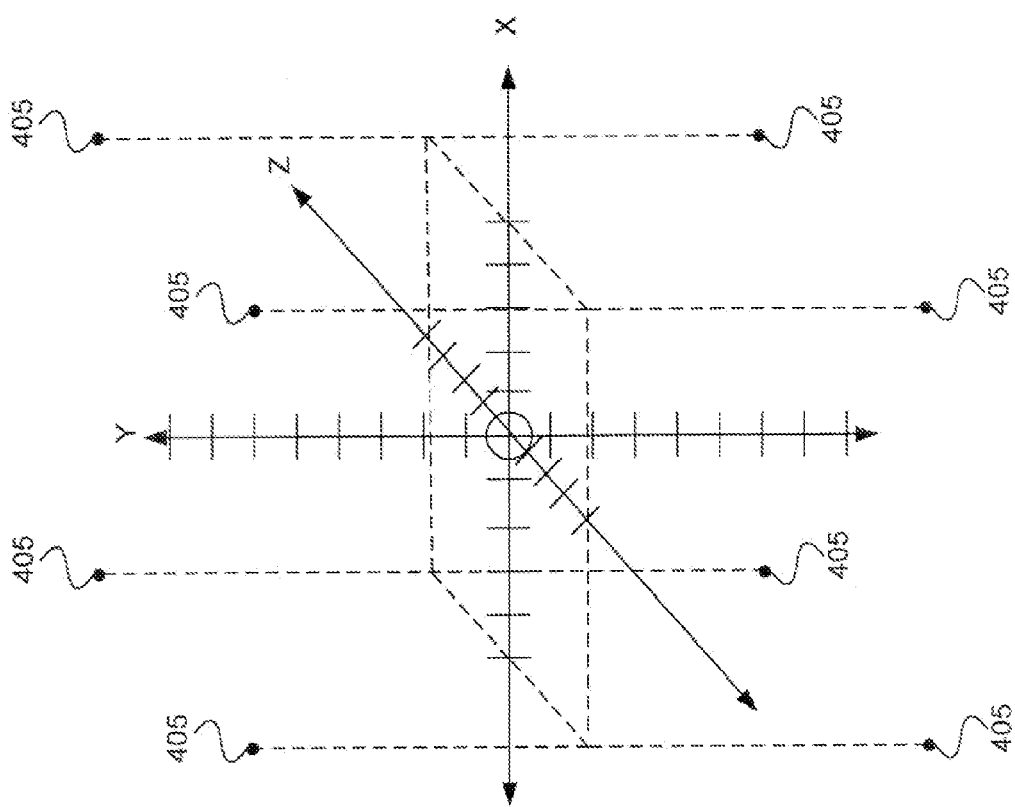
FIG. 4 illustrates a two-dimensional grid showing x and y axes.

Given that some information about the orientation of the tag is known, the RSSI for each antenna can be used to narrow the location of the tag to eight points in the three-dimensional space. To illustrate this point, one must visualize a three-dimensional grid. FIG. 4 illustrates a three-dimensional grid showing x, y, and z axes. In this example the z-axis is orthogonal to both the x and y axes. The grid corresponds to RSSI for three orthogonal antennas represented by axes x, y, and z, with the signpost centered on the intersection of the three axes. In the depicted example, the RSSI was calculated 330 as 5 for the x-axis, as 8 for the y-axis, and as 4 for the z-axis. The calculation 330 produces a single value for each of the x, y, and z axes. However, it is unknown whether the actual value is positive or negative for each of these axes. Thus, the number of possible locations for the tag with respect to the signpost can be thought of as a three bit binary number (+/−x, +/−y, +/−z), yielding eight possible locations 405 for the tag. In FIG. 4 the eight locations 405 are shown. In some embodiments, it may be possible to rule out some of the locations. For example, in the instance of a location where a signpost is stationarily mounted to the ceiling of the location, and the tag is mobile, e.g., on a vehicle roaming the floor of the location, the four points occurring above the signpost can be ruled out.

Optionally, the signpost signal next is validated 340. In one embodiment, the signpost signal is validated 340 against a signal strength qualification level. At this step the signal strength qualification level may be established for the signal received, and the measured 320 signal strength would then be compared to the signal strength qualification level. If the measured 320 signal strength meets the signal strength qualification level, then the signal is validated. As indicated above, signal strength qualification level may be received from the signpost as part of the signpost signal. In this example, the signal strength qualification levels are configurable for transmission via the signposts, which allows for greater control over the range of the signposts, and allows for adjustments of signpost range and/or to reject noise. In some embodiments, if the measured signal strength is less than the signal strength qualification level, the signal is rejected as spurious, and thus is not validated. Alternatively, the signal strength qualification level may be compared to the calculated RSSI.

In addition, or alternatively to the above validation, the validation 340 may include looking at the received data stream itself. For example, the validation 340 may include looking at the error control embedded in the received signpost signal and/or looking at the signpost code information to check for unexpected or spurious data. The error control 935 and signpost code 910, as well as other aspects of the signpost digital word 900 are discussed in greater detail in conjunction with FIG. 9.

Finally, the distance between the signpost and the tag is determined 350 based on a calculation using the RSSI corresponding to each of the one or more antennas. If the signal is validated 340, then the determining 350 is in response to validation of the signal. The distance determination calculation may be based on a basic formula. For example, if multiple antennas are used, determining 350 the distance between the signpost and the tag, which represents an overall RSSI, comprises taking the square root of the sum of the squares of the received signal strength value for the multiple antennas. Continuing with the example shown in FIG. 4, the distance between the signpost and the tag can be calculated as:

$$d = \text{square root}(X^2+Y^2+Z^2) = \text{square root}(105) = 10.25$$

Figure 5:
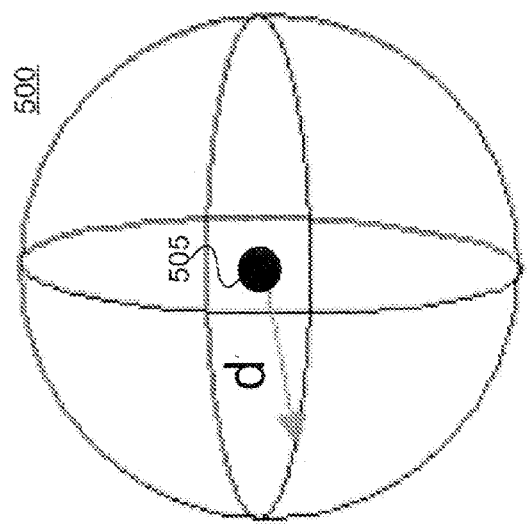
FIG. 5 shows an example of a sphere with radius d from a signpost.

Thus, the possible locations for the tag occur on the surface of a sphere with a radius of 10.25 units from the signpost. FIG. 5 shows an example of a sphere 500 with radius d from a signpost 505.

If the RSSI is calculated 330 for more than one time period, then the distance determination 350 also is made for each time period. Using the data from multiple time periods allows for determination of a direction of movement of the tag relative to the signpost over time. For example, if a distance determination 350 increases over time, it can be concluded that the tag is moving away from the signpost. Alternatively, if the distance determination 350 decreases over time, it can be concluded that the tag is moving toward the signpost. Using the distance determination 350, a crude estimate of location thus also may be made.

The determining 350 step may take place at the tag itself, or at a remote location such as a site server or a smart signpost according to various embodiments. If the determining 350 takes place remotely, the tag transmits the measured signal strength or RSSI to the remote location as part of a tag signal. Tag signals are discussed in greater detail in conjunction with FIG. 10.

Using the measured 320 signal strength from one or more of the antennas, location information can be determined for the tag. For example, using two antennas, the tag location can be narrowed to two intersecting planes; using three antennas, the tag location can be narrowed to eight possible locations (as discussed further below in conjunction with FIG. 4). In addition, known information about placement of the tag relative to the signpost can be used to eliminate some possible locations for the tag.

Figure 3B:
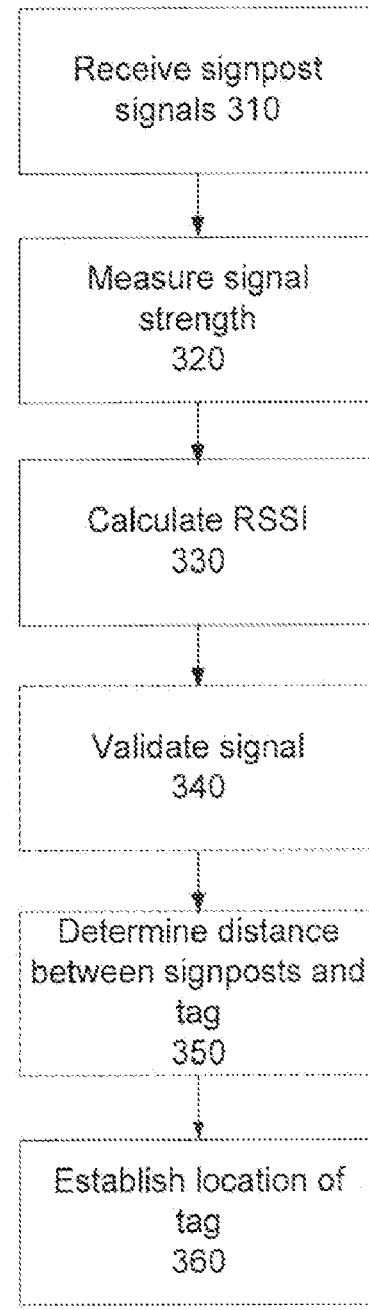
FIG. 3B is a flowchart depicting a method of determining a location for a tag using a plurality of signposts according to one embodiment of the present invention.

The method of establishing a location for a tag using a plurality of signposts comprises several steps that are similar to the method described above. FIG. 3B is a flowchart depicting a method of determining a location for a tag using a plurality of signposts according to one embodiment of the present invention. The method pertains to the use of multiple signposts to more accurately locate the tag.

The method begins with signpost signals being received 310 at the tag. The signpost signals in this example are received 310 from multiple signposts. As above, the signpost signals may be received 310 via multiple antennas on the tag, which may be orthogonally oriented as described above. In order to receive signals from more than one signpost, the signpost signals are synchronized such that they are time-interleaved. The interleaving ensures that signposts with overlapping ranges do not transmit at the same time. For example, two signposts with overlapping ranges can take turns transmitting on odd and even numbered seconds, respectively. Synchronization of the signpost signals may be controlled by a control system, e.g., 120 of FIG. 1.

Next, a signal strength is measured 320 for the received the signpost signals. Because the signpost signals are received 310 from multiple signposts, the measuring 320 occurs for each of the multiple signposts. If the signpost signals are received 310 at multiple antennas on the tag, measuring 320 signal strength includes a measurement with respect to each of the multiple antennas.

Next, a received signal strength indication (RSSI) is calculated 330 using the measured signal strength of the signals received from the signposts. If more than one antenna is used, the RSSI is calculated 330 for each antenna. This step is the same as described above in conjunction with FIG. 3A, except that more than one signpost is involved, thus the details stated above also apply here for each signpost. For example, the number of possible locations for the tag, now with respect to each signpost, can be thought of as a three bit binary number, or eight possible locations.

Optionally, the signpost signal next is validated 340, e.g., against a signal strength qualification level, as described in conjunction with FIG. 3A above.

Then distances optionally are determined 350 between the tag and each of the multiple signposts based on the measured signal strength. Again, this step is similar to the previous method, however, distances are determined 350 between the tag and multiple signposts. If there are multiple antennas on a tag, individual distance determinations corresponding to each of the antennas are made, as well as an overall RSSI, which is calculated using the square root of the sum of the squares of the distance determinations for the antennas, as described above. As with the previous method, distance determinations 350 may be made at the tag or at a remote location.

Using the determined distances between the tag and each of the multiple signposts, a location for the tag may be determined 360. Using just the measured 320 signal strength from one or more of the antennas, location information can be determined for the tag, as described above in conjunction with FIG. 3A. For example, using three antennas and two signposts, the tag location can be narrowed down to the intersection of two eight position vectors, which may be a single point. In addition, known information about placement of the tag relative to the signpost can be used to eliminate some possible locations for the tag.

Figure 7A:
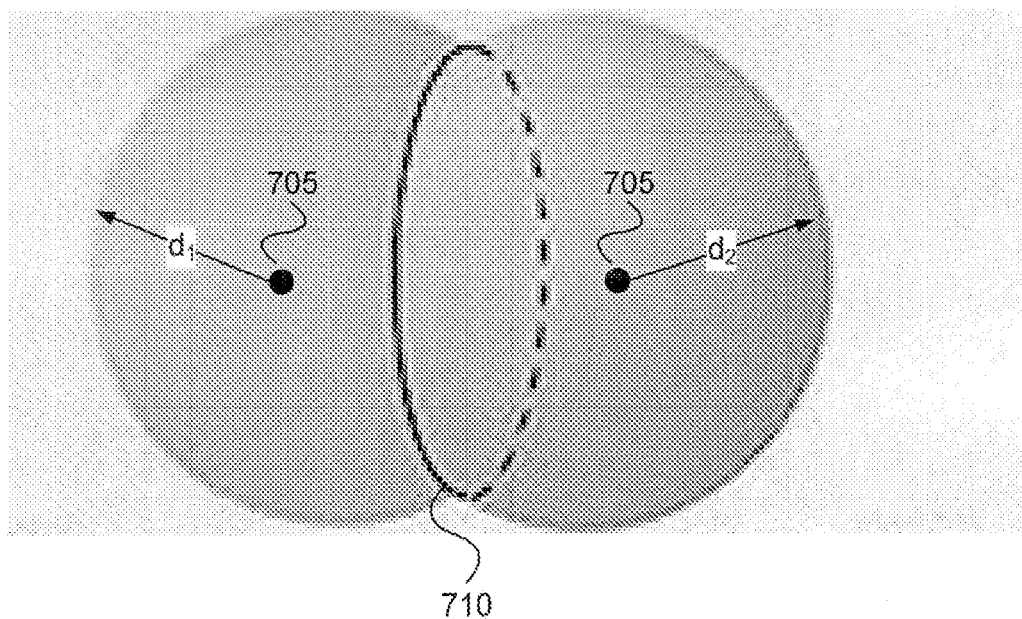
FIGS. 7A and 7B show examples of the reduced possibilities of locations for a tag given multiple spheres.
Figure 7B:
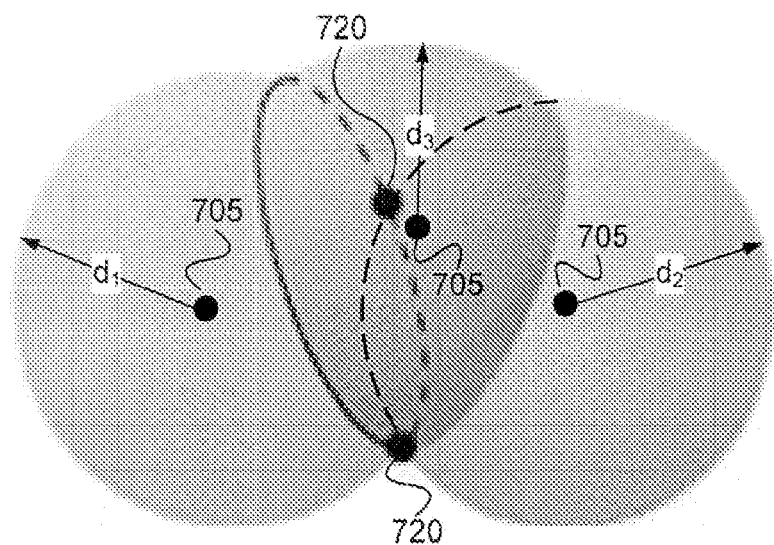

Using just the overall RSSI, multiple signposts can provide a fairly accurate location for a tag. Recall from the distance determination 350 discussed in conjunction with the above method that the overall RSSI is a radius for a sphere of possible locations for the tag on the surface of the sphere. FIGS. 7A and 7B show examples of the reduced possibilities of locations for a tag given multiple spheres. FIG. 7A shows two spheres with radii $d_1$ and $d_2$ from signposts 705. The intersection of the two spheres produces a circle 710. Thus, the possible location for the tag in the range of both signposts 705 is reduced to the circle 710. Using three signposts, the possible locations are even further narrowed, as depicted in FIG. 7B. FIG. 7B shows three spheres with radii $d_1$, $d_2$, and $d_3$. The circle of FIG. 7A intersected with a third sphere (the intersection of three spheres) produces two points 720. Thus, the possible location for the tag in the range of all three signposts 705 was reduced to two points 720. As discussed in conjunction with FIG. 4, in some embodiments it may be possible to rule out some of the locations. For example, in the instance of a location where the signposts are stationarily mounted to the ceiling of the location, and the tags are mobile, e.g., on the vehicles roaming the floor of the location, a portion of the circle shown in FIG. 7A, and one of the two points shown in FIG. 7B, can be ruled out as occurring above the signposts.

In addition, the overall RSSI may be combined with the three bit binary number (eight location vector), as described above in conjunction with FIG. 3A, to more accurately locate the tag. If the eight location vector is used, the eight possible locations for each signpost can be compared to eliminate some of the points as possibilities.

If multiple signposts are used, and thus individual distance determinations and an overall RSSI calculated, determining 360 a location for the tag then includes using the individual distance determinations and overall RSSI. Similar to the distance determinations 350, determining 360 a location for the tag may be made at the tag itself or at a remote location.

The number of signposts involved contributes to the accuracy of the determination 360 of the location of the tag. For example, as shown above the use of three signposts will provide greater accuracy than two signposts. Likewise, the use of four signposts would provide greater accuracy than three signposts. Further, using multiple signposts, known triangulation methods can augment the above methods to locate a tag even more precisely.

Figure 6:
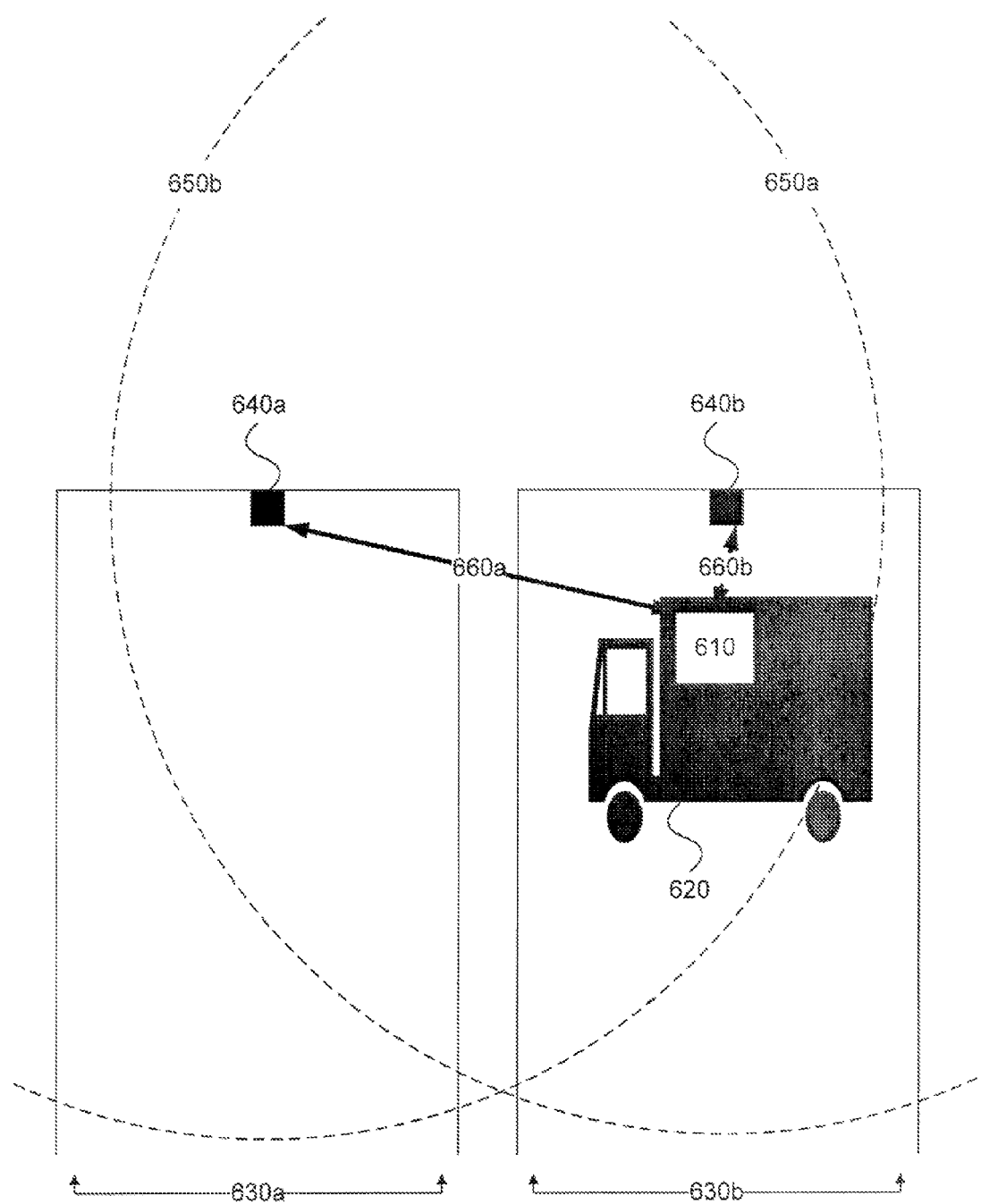
FIG. 6 a tag attached to a truck entering a warehouse through one of two lanes according to one embodiment of the present invention.

Optionally, an RSSI from the various signposts can be used to aid the location determination 360. Comparing signal strengths can provide additional information to help locate the tag with respect to the signposts when some orientation information is known, or when the tag is known to be in one of two possible locations. For example, there may be known physical constraints on possible locations for the tag. FIG. 6 illustrates one such example. Suppose the tag of interest 610 is within a truck 620 that has entered a warehouse through one of two lanes 630, but which lane is unknown. A signpost 640 is placed on the ceiling of each lane 630, each with a similar range radius 650, a portion of which is indicated by dotted lines. When the signal strength is measured 320 for signposts 640, signpost 640a will have a lesser signal strength than signpost 640b, due to the greater distance 660a between signpost 640a and the tag 610 than the distance 660b between signpost 640b and the tag 610. Thus, the relative signal strengths, when compared, indicate that the tag 610 is closer to signpost 640b in lane 630b, and thus the truck with the tag 610 is passing through the rightmost lane. If such a comparison is made, the comparison contributes to the distance determination 350 as well, because the relative signal strengths are proportional to the relative distances between the tag and each of the signposts.

Figure 8:
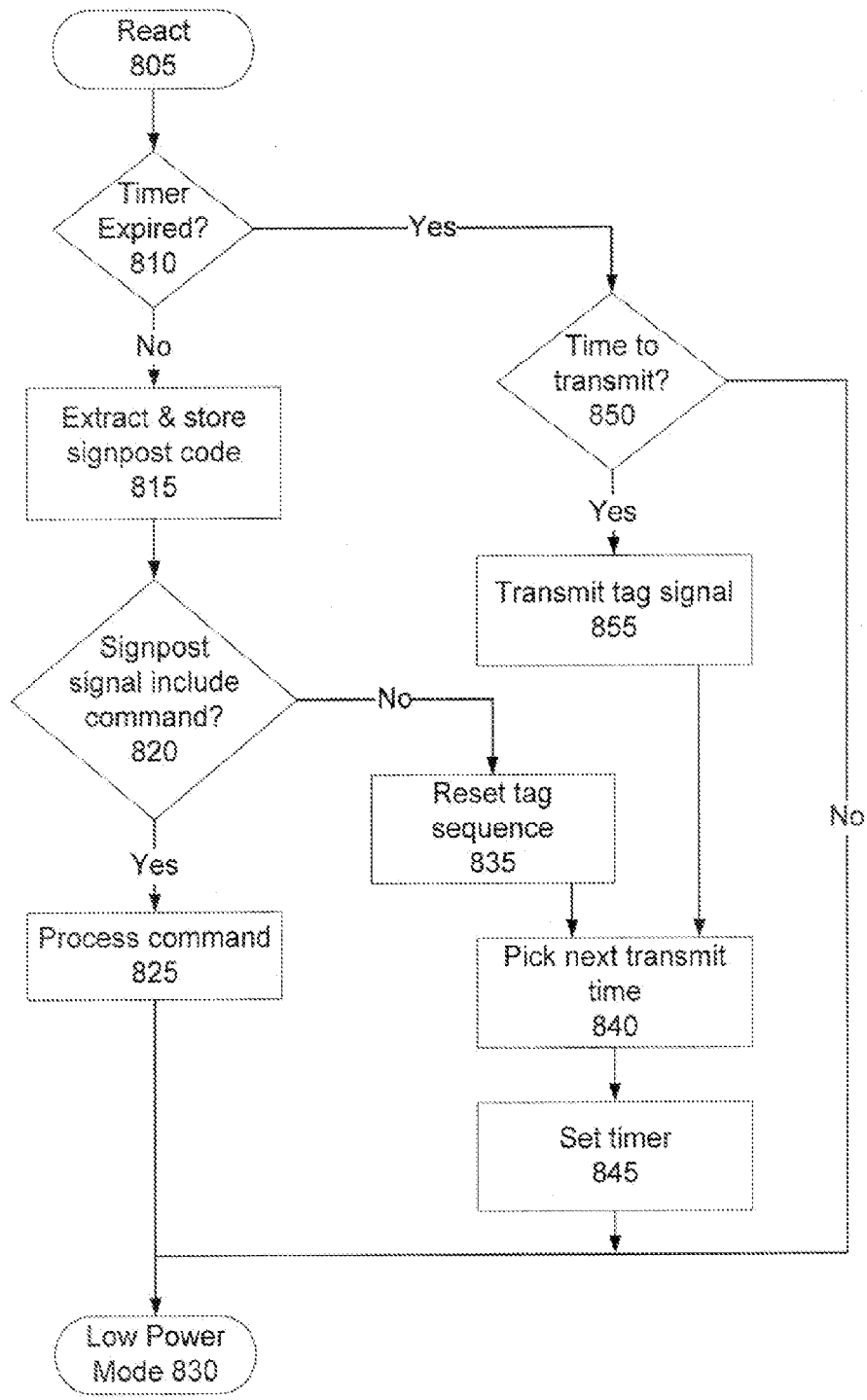
FIG. 8 is a high-level flowchart depicting the operation of a tag according to one embodiment of the present invention.

FIG. 8 is a high-level flowchart depicting the operation of a tag 110. With reference to FIG. 1, the tag 110 has a reduced power mode in which the transmitter 165 is off, the timer 160 is active, the receiver 145 is active, and the microcontroller 150 is in a reduced power mode, from which it can react in response to either the receiver 145, expiration of the timer 160, or an event. The flowchart of FIG. 8 begins at a point in time when the tag 110 reacts up from the reduced power mode, either because the receiver 145 has received a signpost signal, or because the timer 160 has expired.

The process proceeds from block 805 to block 810, where the microcontroller 150 checks to see if the timer 160 has expired. If not, then it knows that the receiver 145 has received a signpost signal, and it proceeds to block 815, where it extracts and stores the signpost code (910 in FIG. 9) from the received signpost signal. Then, control proceeds to block 820, where the tag checks to see whether the received signpost signal also includes a command in either of fields 915 and 920 (FIG. 9). If so, then the tag proceeds to block 825, where it executes the command. Then the tag proceeds to block 830, where it returns to its reduced power mode.

Looking again at block 820, if the tag were to determine that the signpost signal did not include a command, then the tag would have proceeded to block 835, where it resets the tag sequence. Then, at block 840, the tag determines the next point in time at which it needs to transmit its tag signal according to the tag sequence. As discussed above, this will involve a random determination of a point in time within the time slot, for example using a pseudo-random technique of a known type. Once this point in time has been selected, the tag 110 sets the timer 160 (FIG. 1) in block 845 of FIG. 8, so that the timer will expire at the proper point in time to allow transmission of the next tag signal, and then the tag 110 returns to the low power mode at block 830.

Returning to block 810 in FIG. 8, if it had been determined that the microcontroller 150 reacts from the reduced mode because the timer 160 expired, the microcontroller 150 would have proceeded from block 810 to block 850. In block 850, a determination is made of whether the timer expired because it is time to transmit the next tag signal. If not, then the tag proceeds directly to block 830, where it returns to the low power mode. Otherwise, it proceeds from block 850 to 855, where it effects transmission of its tag signal (FIG. 1). It then proceeds to block 840, where it picks the transmit time for its next successive tag signal. Then, at block 845, it sets the timer to expire at the point in time that it determined. Then, at block 830, it returns to the reduced power mode.

FIG. 9 is a diagrammatic view of a digital word 900 corresponding to a signpost signal having several different fields of information. The bits of the digital word 900 are transmitted in the signpost signal by serially modulating the bits of the word 900 onto the 123 KHz carrier using amplitude modulation, as mentioned above. The bits of the words 900 are transmitted serially from left to right in FIG. 9. The first field is a preamble 905, which is a predefined pattern of bits that will allow a device receiving the signal to recognize that the signpost signal is beginning, and to synchronize itself to the signpost signal. In the disclosed embodiment, the preamble is approximately 8 bits, but the specific number of bits can vary in dependence on characteristics of the particular receiver which is expected to be used to receive the signpost signal.

The next field in the word 900 is a signpost code 910, which in the disclosed embodiment is a 12-bit integer value that uniquely identifies the particular signpost which is transmitting the word 900. As mentioned above, the system 200 may have a number of signposts 210, and the use of different signpost codes 910 by different signposts 210 permits the system 200 to distinguish signpost signals transmitted by one signpost 210 from those transmitted by another, in a manner discussed in more detail later. The use of a signpost 910 also enabled the tag to validate 340 the signpost as described above in conjunction with FIGS. 3A and 3B.

This does not mean that this system 200 could never have two signposts 210 with exactly the same signpost code. For example, two signposts 210 might be stationarily mounted in close proximity to each other and configured to independently transmit effectively identical signpost signals, not in synchronism, in order to increase the likelihood that a receiver will pick up the signpost signal from at least one of the two signposts. In effect, this represents a level of redundancy, in order to increase reliability and accuracy. A different possible scenario is that two signposts 210, which are fixedly mounted at respective locations remote from each other, could conceivably use exactly the same signpost code 910. For example, if they each communicated with the control system 120 through a respective different reader, the control system 120 would have the capability to distinguish them from each other.

The next field in the word 900 of FIG. 9 is a tag command 915, which is a command to the tag that can affect the operation of the tag. The tag command field 915 is a 2-bit field. The purpose of the tag command field 915 is to affect the operation of the tag. The tag command field 915 is a 2-bit field which can be used to instruct a tag (1) to turn itself off (which is actually a low power mode in which no tag signals are transmitted), (2) to turn itself on (which is a mode in which tag signals are transmitted in the manner described above in association with FIG. 8), (3) to operate at a fast tag rate, or (4) to operate at a slow tag rate (where the slow rate uses a duration for each time slot that is longer than the duration used for the fast rate).

The next two fields in the word 900 are a control command 920 and a parameter 925, which are related. In the disclosed embodiment, the control command 920 is a 4-bit field, and a parameter 925 is an 8-bit field. The control command 920 is similar to the tag command 915, to the extent that they each instruct the tag to do something. The difference is that the control commands 920 generally requires an accompanying parameter 925, whereas the tag commands 915 do not use parameters. One command which can be specified in the control command field 920 is an instruction to the tag to set the tag code that it puts into field 1025 (FIG. 10), and in that case the parameter field 925 would contain the new tag code. Another command which can be specified by the control command field 920 is an instruction to the tag to set a password or an encryption key used for security, as discussed above, and the parameter field 925 would contain the new password or encryption key. Yet another command which can be specified by the control command field 920 is an instruction to the tag to set the tag type code that it puts into field 1015 (FIG. 10), or the asset type code that it puts into field 1020, and the parameter field 925 would contain the new tag type code or asset type code. Still other commands in the control command field 920 could instruct the tag to ignore the signpost signal unless it is at or above a signal strength qualification level, and the parameter field 925 would contain the signal strength qualification level. It will be recognized that there are still other commands which could be sent to the tag using the control command field 920 and, where needed, the parameter field 925.

The next field in the word 900 is an extension flag 930, which is a 1-bit field. In the disclosed embodiment, this field is always a binary "0" for the word format 900 of FIG. 9. It is provided for the purpose of facilitating future compatibility. For example, if it was necessary at some future time to modify the format of the word 900, the flag 930 would be set to a binary "1" in each word having the new format, so that a device receiving the signpost signal could determine whether the word 900 received in that signal had the original format shown at 900 in FIG. 9, or the new format.

The next field in word 900 is an error control field 935. Since communications between the signpost and other devices are essentially one-way transmissions, and since many applications for the apparatus of FIG. 1 involve environments that have relatively high noise levels, it is important for a receiving device to be able to evaluate whether the word 900 it received in a signpost signal is correct, or whether it has errors, for example, as described in conjunction with validation step 340, discussed above in conjunction with FIGS. 3A and 3B. Consequently, the error control field 935 is included to provide a degree of forward error correction (FEC). In the disclosed embodiment, the error control field 935 contains eight parity bits, but the number of parity bits may be different if the total number of bits in the word 900 is changed, or if a different one of several well-known parity schemes is selected for use. In addition to use of the error control field 935, the overall level of reliability and accuracy can also be increased by causing a device which receives the signpost signal to save and compare two successive transmissions of a given signpost signal, in order to verify that they are completely identical.

The last field in the word 900 is a packet end field 940. This field signals to a receiving device that the transmission is ending. In the embodiment of FIG. 9, the packet end field 940 has eight bits which are all set to a binary "0."

As mentioned above, the signpost signal is typically transmitted in a relatively noisy environment. In order to ensure reliable signal detection, known techniques may be employed to improve the signal to noise ratio (SNR). In the disclosed embodiment of FIG. 1, the amplitude modulation of the 123 KHz carrier is effected using the well-known technique of amplitude shift keying (ASK), in order to improve the SNR. Alternatively, frequency shift keying (FSK) or phase shift keying (PSK) could be used. However, FSK or PSK would typically require additional front-end analog circuitry in each tag. Therefore, and since an object of the present invention is to implement both the signpost and the tag at a low cost, ASK may be used according to one embodiment.

As noted above, communications between the signpost and the tag are one-way communications involving the signpost signals according to one embodiment. With this in mind, it is desirable to provide a degree of security that ensures the tag will react only to valid signpost signals, especially with respect to the commands in fields 915-925. Therefore, the fields 905-940 in the word 900 can be subjected to security protection using well-known encryption and/or password techniques.

In the disclosed embodiment, the tag information transmitted in the tag signals may take one of two different forms, both of which are shown in FIG. 10. More specifically, if the tag has received a valid signpost signal through the antenna 155 and the receiver 145, the tag information transmitted in the tag signal will have the word format shown at 1000a in FIG. 10. In contrast, during periods of time when the tag is outside the transmission range of the signpost signals from any signpost, the tag information transmitted in the signal will have the word format shown at 1000b in FIG. 10.

The word format 1000a will be discussed first. It begins with a preamble 1005, which is functionally comparable to the preamble 905 of the word 900 shown in FIG. 9. In the disclosed embodiment, the preamble 1005 lasts 1.21035 microseconds, and includes 20 cycles which each include a 30 microsecond logic high and a 30 microsecond logic low, followed by one cycle which includes a 42 microsecond logic high and then a 54 microsecond logic low. The next field in the word 1000a is a 1-bit format field 1010, which is provided to indicate to a receiving device which of the two formats 1000a and 1000b in FIG. 10 is the format used for the instant tag signal. Thus, the field 1010 is always a "1" bit in word 1000a, and a "0" bit in word 1000b.

The next field in the word 1000a is a 4-bit tag type field 1015, which is a code that provides some information about how the particular tag 12 is being used in the system. In this regard, the code may indicate that the tag is stationarily mounted, for example on a ceiling, or may indicate that the tag is mounted on some form of mobile device. Further, where the tag is mounted on a mobile device, the tag type code 1015 can provide some information about that mobile device, such as whether that mobile device has a standard height, or has a taller, high profile height.

The next field in the word 1000a is a 3-bit asset type field 1020. Where the tag is attached to some type of mobile device, the asset type field 1020 can identify the specific type of mobile device to which the tag is attached. For example, the field 1020 may indicate that the asset is attached to some form of container, to a trailer or dolly on which a container can be transported, or to a tractor capable of pulling trailers having containers thereon.

The next field in the word 1000a is a signpost code 1030. This is identically the signpost code extracted at 910 from the signpost word 900 that was most recently received by the tag. In the depicted embodiment, the word 1000a has only one signpost code field 1030, corresponding to a system configured such that each tag is within the transmission range of only one signpost at any given point in time. Alternatively, additional fields may be provided for additional signpost codes in the word 1000a, to allow for cases in which the tag is within the transmission range of multiple signposts at the same time, while receiving and reporting signpost codes for all of those signposts.

The next field in word 1000a is a last command field 1035, which is identically the last command that was received in either of the fields 915 or 920 of the signpost word 900 provided by the signpost having the signpost code which is present in the field 1030. This provides confirmation to the control system that the tag received this particular command from the signpost.

The next field(s) 1040, 1045 in the word 1000a represent possible RSSI values. The number of RSSI value 1040 fields is dependent upon the number of receiving antennas on the tag. Thus, for the example depicted in FIG. 1, which has three orthogonal antennas, three RSSI value fields 1040a-c are used. Each RSSI value field is 16 bits. The analog RSSI value received at each of the antennas 155 can be digitized, for example, using an analog to digital converter in the microcontroller 150 of the tag 110 shown in FIG. 1. If the converter is not 16-bit (e.g., is a 12-bit converter), then the lower-bit value is padded to a 16-bit value so that it is byte aligned. Optionally, the tag word 1000a can transmit only an overall RSSI value (total) 1045 instead of individual antenna values, to save air bandwidth.

The next field in the word 1000a is an error control field 1050. In the disclosed embodiment, this is a 16-bit field containing a cyclic redundancy code (CRC) of a known type, which is calculated using the information in fields 1010-1015, 1020-1030, and 1035. The tag signals transmitted by the tag to the reader are essentially one-way signals, and the error control field 1050 is therefore provided to give the reader a degree of capability to detect and correct some errors in a received word 1000a. The reader can also increase accuracy and reliability by receiving and comparing two successive tag signals and verifying that they are identical.

The last field in the word 1000a is a packet end field 1055, which in the disclosed embodiment is a logic low of 900 microseconds. The packet end field 1055 indicates to a receiving device that the field 1055 is the end of the word 1000a which is currently being received.

Turning to the alternative format 1000b of the tag word, the basic difference from the word 1000a is that the fields 1030, 1035, 1040a-c, and 1045, if present, of the word 1000a are omitted from the word 1000b. This is because the fields 1030 and 1035 contain information extracted from the last received signpost word 900. In contrast, as mentioned above, the tag word 1000b is used in situations where the tag is not currently receiving any signpost signals, and thus has no current information to put into the fields 1030 and 1035. Therefore, the fields 1030 and 1035 are omitted in word format 1000b.

In one embodiment, the tag is in a mode in which it always sends tag signals to the reader regardless of whether it is receiving signpost signals. In another embodiment, the tag is in a mode in which it only sends tag signals if it has received signpost signals. In this example, only word 1000a would be used.

In theory, it would be possible to use the word format 1000a even when the tag is not currently receiving information from any signpost, and to simply put a "dummy" code such as all zeros into each of the fields 1030 and 1035. However, governmental regulations regarding radio transmissions tend to involve a balancing between factors such as the power level at which a tag signal is transmitted, the time interval between successive transmissions of tag signals, and the amount of information present in each tag signal. By using the tag word format 1000b when the fields 1030 and 1035 are not needed, the duration of the transmission of the tag signal is reduced, which in turn facilitates compliance with governmental regulations.

There are two other differences between the tag word format 1000b and the tag word format 1000a. First, the field 1010 is always a binary "1" in word 1000a, and a binary "0" in the word 1000b, as discussed above. Second, the CRC value used in error control field 1050 is calculated using fields 1010-1015 and 1020-1025 in tag word 1000b, because the fields 1030 and 1035 are not present, and thus cannot be taken into account.

Each transmission of the tag signal is similar to the transmission of a signpost signal, in that it is a short burst at the carrier frequency which includes one occurrence of either the word 1000a or the word 1000b (FIG. 10). The tag uses one technique for sequencing the tag transmissions when the tag is not currently receiving any valid signpost signals, and uses a different technique for sequencing the tag signals in response to the receipt of a valid signpost signal, e.g., as discussed on conjunction with FIG. 8.

Figure 11:
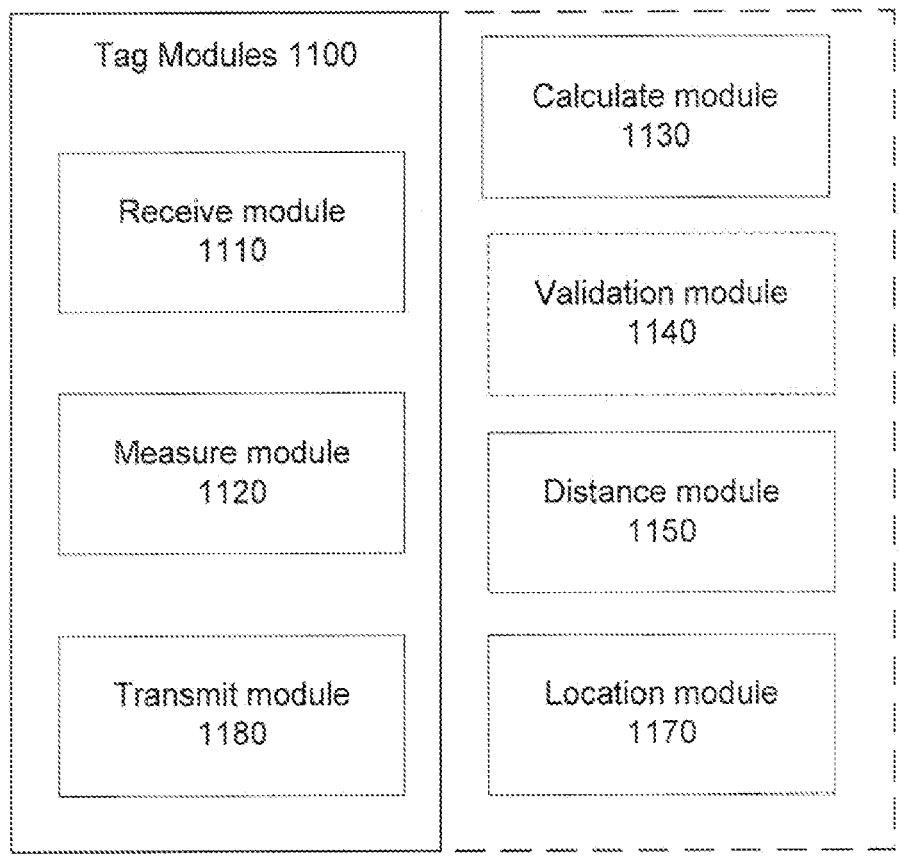
FIG. 11 is a block diagram illustrating various modules for facilitating the methods of the present invention.

FIG. 11 is a block diagram illustrating various modules 1110-1180 for facilitating the methods of the present invention. The modules 1110-1180 are comprised of a number of executable code portions and data files. These include code for facilitating the methods described herein. In other embodiments, the modules 1110-1180 can be implemented as a stand-alone software application outside of the architecture of FIG. 1.

The modules 1110-1180 are responsible for orchestrating the processes performed according to the methods of the present invention. The modules 1110-1180 include a receive module 1110, a measure module 1120, an optional validation module 1130, a calculate value module 1140, a distance module 1150, an optional compare module 1160, a location module 1170, and a transmit module 1180 according to one embodiment of the present invention. As indicated by the solid and dotted lines, some of the above modules 1110-1180 are tag modules that typically reside on a tag, whereas the other modules reside on the tag in one embodiment, and reside elsewhere in other embodiments. The modules 1110-1180 may be coupled or otherwise enabled to pass signals between the various modules 1110-1180.

The receive module 1110 enables the system to receive signpost signals at a tag from a signpost, and is one means for so doing, according to one embodiment. These signals may include signpost codes and/or a signal strength qualification level.

The measure module 1120 enables the system to measure at the tag a signal strength for the received signals with respect to one or more antennas on the tag, and is one means for so doing, according to one embodiment. The signal strength measurements may take place at the RSSI pin for each receiving channel on a low frequency receiver on the tag, from which the measure module 1120 can receive the measurements.

The validation module 1130 enables the system to optionally validate the signals against a signal strength qualification level, and is one means for so doing, according to one embodiment. Specifically, the validation module 1130 may enable the system to validate a signal by comparing it to the signal strength qualification level, and if the signal strength qualification level is met, the signal is valid. The validation module 1130 may further enable the system to reject as spurious signals that do not meet the signal strength qualification level. In this example, the signal strength qualification levels are configurable for transmission via the signposts, which allows for greater control over the range of the signposts, and allows for adjustments for noise.

The calculate value module 1140 enables the system to calculate, for each of the one or more signposts, the received signal strength value, and is one means for so doing, according to one embodiment.

The distance module 1150 enables the system to determine the distance between the signpost and the tag based on the received signal strength value corresponding to each of the one or more antennas, and is one means for so doing, according to one embodiment. Specifically, the distance module 1150 enables the system to determining the distance between the signpost and the tag by taking the square root of the sum of the squares of the received signal strength value for the multiple antennas.

The optional compare module 1160 enables the system to optionally compare relative signal strengths received from the various signposts, and is one means for so doing, according to one embodiment.

The location module 1170 enables the system to establish a location for the tag, and is one means for so doing, according to one embodiment.

The transmit module 1180 enables the system to transmit tag signals to a site server, and is one means for so doing, according to one embodiment.

The above modules 1110-1180 need not be discrete software modules. The software configuration shown is meant only by way of example; other configurations are contemplated by and within the scope of the present invention.

One skilled in the art will recognize that the architecture illustrated in FIG. 11 is merely exemplary, and that the invention may be practiced and implemented using many other architectures and environments.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of determining a distance between a signpost and a tag, the method comprising:
   receiving at the tag a near-field magnetic signal from the signpost;
   measuring at the tag a first signal strength of the near-field magnetic signal received from the signpost with respect to a first antenna on the tag;
   calculating a received signal strength indication using the first signal strength of the near-field magnetic signal received from the signpost at the first antenna;
   determining a distance between the signpost and the tag based on the calculated received signal strength indication;
   measuring at the tag a second signal strength of a signal received from the signpost with respect to a second antenna on the tag;
   measuring at the tag a third signal strength of a signal received from the signpost with respect to a third antenna on the tag; and
   determining location information for the tag using the measured signal strengths from the first antenna, the second antenna, and the third antenna, wherein determining the location information comprises calculating an eight position vector using the measured signal strength of the signals received from the signpost at the first antenna, the second antenna, and the third antenna to yield eight possible locations for the tag.

2. The method of claim 1, further comprising:
   establishing a signal strength qualification level for the signal received from the signpost at the first antenna;
   comparing the first signal strength to the signal strength qualification level; and
   validating the signal received with respect to the first antenna if the first signal strength meets the signal strength qualification level.

3. The method of claim 2, wherein determining the distance between the signpost and the tag is in response to validating the signal received at the first antenna.

4. The method of claim 2, further comprising rejecting the signal received with respect to the first antenna as spurious if the first signal strength is less than the signal strength qualification level.

5. The method of claim 2, wherein the signal strength qualification level is configurable by the signpost and provided to the tag by the signpost signal.

6. The method of claim 1, further comprising:
   establishing a signal strength qualification level for the signal received from the signpost with respect to the first antenna;
   comparing the calculated signal strength indication to the signal strength qualification level; and
   validating the signal received with respect to the first antenna if the calculated signal strength indication meets the signal strength qualification level.

7. The method of claim 1, wherein:
   the second antenna is oriented orthogonal to the first antenna; and
   the received signal strength indication is calculated using the signals received at the first and the second antennas.

8. The method of claim 7, wherein the calculating comprises taking a square root of a sum of squares of the measured signal strength of the signals received at the first and the second antennas.

9. The method of claim 7, wherein:
   the third antenna is oriented orthogonal to the second antenna and the first antenna; and
   the received signal strength indication is calculated using the signals received at the three antennas.

10. The method of claim 9, wherein the calculating comprises taking a square root of a sum of squares of the measured signal strength of the signals received at the three antennas.

11. The method of claim 1, wherein the location information determination comprises determining two intersecting planes comprising possible locations for the tag using the measured signal strength from the first antenna and the second antenna.

12. The method of claim 1, wherein the location information determination further comprises eliminating some of eight possible locations for the tag with respect to the first signpost using known information about placement of the tag relative to the signpost.

13. The method of claim 1, wherein determining the distance between the signpost and the tag takes place at the tag.

14. The method of claim 1, further comprising transmitting the received signal strength indication to a site server, wherein determining the distance between the signpost and the tag takes place at the site server.

15. The method of claim 1, wherein measuring at the tag the signal strength of the signal received from the signpost with respect to the first antenna takes place at a first time, further comprising:
   measuring at the tag a signal strength of a signal received from the signpost with respect to the first antenna at a second time;
   calculating a received signal strength indication using the measured signal strength of the signal received at the second time;
   determining a distance between the signpost and the tag at the second time based on the calculated signal strength indication at the second time; and
   thereby determining a direction of movement of the tag relative to the signpost over time.

16. A tag, comprising:
   a receive module for receiving at the tag a near-field magnetic signal from the signpost;
   a measure module for measuring at the tag a first signal strength of the near-field magnetic signal received from the signpost with respect to a first antenna on the tag, measuring at the tag a second signal strength of a signal received from the signpost with respect to a second antenna on the tag, measuring at the tag a third signal strength of a signal received from the signpost with respect to a third antenna on the tag, the measure module enabled to receive signals from the receive module;
   a distance module for determining a distance between the signpost and the tag based on the first signal strength, the distance module enabled to receive signals from the measure module; and
   a location module for determining location information for the tag using the measured signal strengths from the first antenna, the second antenna, and the third antenna, wherein determining the location information comprises calculating an eight position vector using the measured signal strength of the signals received from the signpost at the first antenna, the second antenna, and the third antenna to yield eight possible locations for the tag.

17. The tag of claim 16, further comprising:
a calculate module for calculating a received signal strength indication using the first signal strength of the signal received from the signpost at the first antenna, the calculate module enabled to received signals from the measure module; and
wherein determining the distance between the signpost and the tag is based on the calculated received signal strength indication, the distance module enabled to receive signals from the calculate module.

18. The tag of claim 16, wherein:
the second antenna is oriented orthogonal to the antenna on the tag; and
the calculate module is further configured to calculate the received signal strength indication using the signals received at the first and the second antennas.

19. The tag of claim 18, wherein the calculating comprises taking a square root of a sum of squares of the measured signal strength of the signals received at the first and the second antennas.

20. The tag of claim 18, wherein:
the third antenna oriented is orthogonal to the second antenna and the antenna on the tag; and
wherein the calculate module is further configured to calculate the received signal strength indication using the signals received at the three antennas.

21. The tag of claim 18, wherein the calculating comprises taking a square root of a sum of squares of the measured signal strength of the signals received at the three antennas.

22. The tag of claim 16, further comprising:
a validation module enabled to receive signals from the measure module, configured for:
establishing a signal strength qualification level for the signal received from the signpost with respect to the first antenna;
comparing the calculated signal strength indication to the signal strength qualification level; and
validating the signal received with respect to the first antenna if the calculated signal strength indication meets the signal strength qualification level.

23. The tag of claim 22, wherein determining the distance between the signpost and the tag is in response to validating the signal received with respect to the first antenna, the distance module enabled to receive signals from the validation module.

24. The tag of claim 22, wherein the validation module is further configured for rejecting the signal received with respect to the first antenna as spurious if the first signal strength is less than the signal strength qualification level.

25. The tag of claim 22, wherein the signal strength qualification level is configurable by the signpost and provided to the tag by the signpost signal.

26. The tag of claim 16, further comprising:
a validation module enabled to receive signals from the calculate module, configured for:
establishing a signal strength qualification level for the signal received from the signpost with respect to the first antenna;
comparing the calculated signal strength indication to the signal strength qualification level; and
validating the signal received with respect to the first antenna if the calculated signal strength indication meets the signal strength qualification level.

27. The tag of claim 16, wherein measuring at the tag the signal strength of the signal received from the signpost with respect to the first antenna takes place at a first time, wherein:
the measure module is further configured for measuring at the tag a signal strength of a signal received from the signpost with respect to the first antenna at a second time;
the calculate module is further configured for calculating a received signal strength indication using the measured signal strength of the signal received at the second time; and
the distance module is further configured for determining a distance between the signpost and the tag at the second time based on the calculated signal strength indication at the second time, thereby determining a direction of movement of the tag relative to the signpost over time.

28. A signpost, comprising:
a transmit module for transmitting to a tag a near-field magnetic signal;
a receive module for receiving from the tag information regarding a first signal strength measured with respect to a first antenna on the tag, a second signal strength measured with respect to a second antenna on the tag, and a third signal strength measured with respect to a third antenna on the tag;
a calculate module for calculating a received signal strength indication using the first signal strength;
a distance module for determining a distance between the signpost and the tag based on the calculated received signal strength indication; and
a location module for determining location information for the tag using the measured signal strengths from the first antenna, the second antenna, and the third antenna, wherein determining the location information comprises calculating an eight position vector using the measured signal strength of the signals received from the signpost at the first antenna, the second antenna, and the third antenna to yield eight possible locations for the tag.

29. The signpost of claim 28, wherein a signal strength qualification level is configurable by the signpost and provided to the tag by the near-field magnetic signal.

30. A system, comprising:
a signpost for transmitting a near-field magnetic signal; and
a tag for receiving the near-field magnetic signal from the signpost and for determining a distance between the signpost and the tag using a signal strength of the received signal, the tag comprising:
a receive module for receiving at the tag the near-field magnetic signal from the signpost;
a measure module for measuring at the tag a first signal strength of the near-field magnetic signal received from the signpost with respect to a first antenna on the tag, measuring at the tag a second signal strength of a signal received from the signpost with respect to a second antenna on the tag, measuring at the tag a third signal strength of a signal received from the signpost with respect to a third antenna on the tag, the measure module enabled to receive signals from the receive module;
a distance module for determining a distance between the signpost and the tag based on the first signal strength, the distance module enabled to receive signals from the measure module; and
a location module for determining location information for the tag using the measured signal strengths from the first antenna, the second antenna, and the third antenna, wherein determining the location information comprises calculating an eight position vector using the measured signal strength of the signals received from the signpost at the first antenna, the second antenna, and the third antenna to yield eight possible locations for the tag.

31. A computer program product comprising a computer-readable medium having computer program instructions embodied thereon for determining a distance between a signpost and a tag, the computer program product comprising:
   a receive module for receiving at the tag a near-field magnetic signal from the signpost;
   a measure module for measuring at the tag a first signal strength of the near-field magnetic signal received from the signpost with respect to a first antenna on the tag, measuring at the tag a second signal strength of a signal received from the signpost with respect to a second antenna on the tag, measuring at the tag a third signal strength of a signal received from the signpost with respect to a third antenna on the tag, the measure module enabled to receive signals from the receive module;
   a distance module for determining a distance between the signpost and the tag based on the first signal strength, the distance module enabled to receive signals from the measure module; and
   a location module for determining location information for the tag using the measured signal strengths from the first antenna, the second antenna, and the third antenna, wherein determining the location information comprises calculating an eight position vector using the measured signal strength of the signals received from the signpost at the first antenna, the second antenna, and the third antenna to yield eight possible locations for the tag.

32. The computer program product of claim 31, further comprising:
   a calculate module for calculating a received signal strength indication using the first signal strength of the signal received from the signpost at the first antenna, the calculate module enabled to received signals from the measure module; and
   wherein determining the distance between the signpost and the tag is based on the calculated received signal strength indication, the distance module enabled to receive signals from the calculate module.

33. The computer program product of claim 31, further comprising:
   a validation module configured for:
      establishing a signal strength qualification level for the signal received from the signpost with respect to the first antenna;
      comparing the calculated signal strength indication to the signal strength qualification level; and
      validating the signal received with respect to the first antenna if the calculated signal strength indication meets the signal strength qualification level.

34. The computer program product of claim 33, wherein determining the distance between the signpost and the tag is in response to validating the signal.

35. The computer program product of claim 33, wherein the validation module is further configured for rejecting the signal received with respect to the first antenna as spurious if the first signal strength is less than the signal strength qualification level.

36. The computer program product of claim 33, wherein the signal strength qualification level is configurable by the signpost and provided to the tag by the signpost signal.

37. The computer program product of claim 31, wherein measuring at the tag the signal strength of the signal received from the signpost with respect to the first antenna takes place at a first time, wherein:
   the measure module is further configured for measuring at the tag a signal strength of a signal received from the signpost with respect to the first antenna at a second time;
   the calculate module is further configured for calculating a received signal strength indication using the measured signal strength of the signal received at the second time; and
   the distance module is further configured for determining a distance between the signpost and the tag at the second time based on the calculated signal strength indication at the second time, thereby determining a direction of movement of the tag relative to the signpost over time.

* * * * *